United States Patent [19]

Shima et al.

[11] Patent Number: 4,760,900

[45] Date of Patent: Aug. 2, 1988

[54] FRICTION BRAKES

[75] Inventors: Takashi Shima, Tokyo; Katuro Takasawa, Saitama; Tomoharu Ashikawa, Kanagawa; Taro Tsujimura, Tokyo; Yasuo Takenaka, Kanagawa; Shunichi Tomizuka, Hokkaido, all of Japan

[73] Assignees: The Japan Steel Works, Ltd.; Japanese National Railways, both of Tokyo, Japan

[21] Appl. No.: 243,110

[22] Filed: Mar. 12, 1981

[30] Foreign Application Priority Data

Mar. 25, 1980 [JP] Japan ................................. 55-36873

[51] Int. Cl.<sup>4</sup> ............................................. F16D 69/02
[52] U.S. Cl. .......................... 188/251 M; 188/251 R
[58] Field of Search ............... 428/676, 677, 681–685, 428/939; 188/251 M, 255, 251 R

[56] References Cited

PUBLICATIONS

*Webster's Seventh New Collegiate Dictionary*, G. & C. Merriam Company, Springfield, MA, publ., 1965, pp. 170 and 532.

Muraki, *Journal of the Japan Foundrymen's Society,* vol. 30, No. 12, Dec. 1958, pp. 959–967.

*Primary Examiner*—Deborah Yee
*Attorney, Agent, or Firm*—Sughrue, Mion, Zinn, Macpeak & Seas

[57] ABSTRACT

A composite metal material for a friction brake composed of a sliding friction surface metal layer of grey cast iron and a layer of a high strength different metal having a crack transmission resistance. The grey cast iron and high strength different metal are metallurgically bonded together. In this composition metal material, cracks formed in the sliding friction surface metal layer are prevented from spreading by the high strength different metal having a high crack transmission resistance. An intermediate metal layer may be provided if desired.

3 Claims, 1 Drawing Sheet

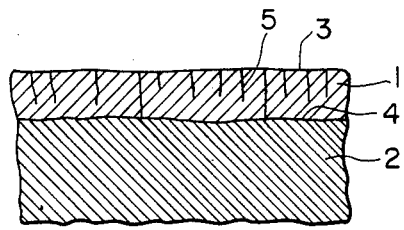
FIG. 1
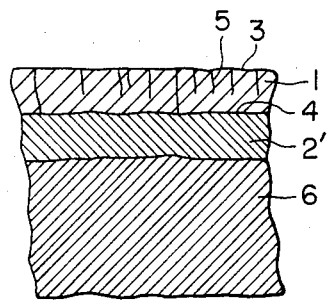
FIG. 2
FIG. 3
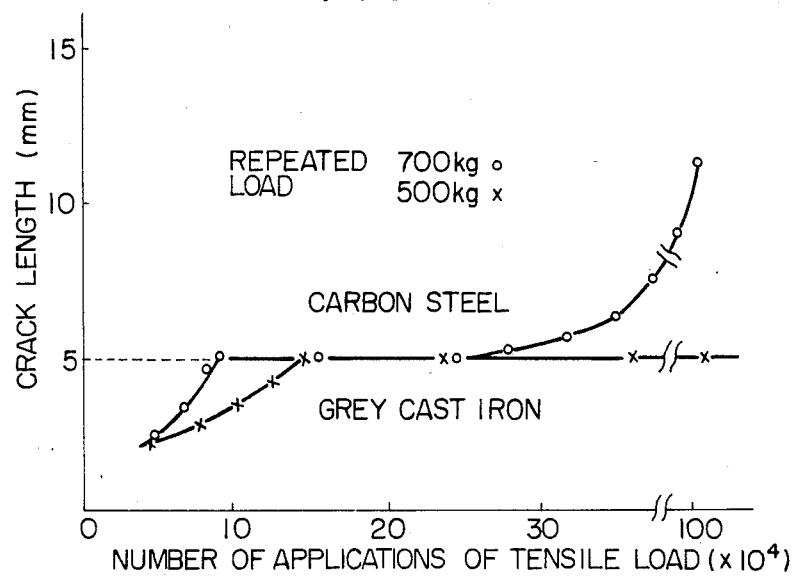

FRICTION BRAKES

BACKGROUND OF THE INVENTION

1. Field of the Invention

The present invention relates to composite metal materials having a high heat crack resistance and more particularly to composite metal materials for use in a brake plate or drum of a friction brake which prevents the growth of cracks caused by heat impact or heat fatigue resulting from sliding friction.

2. Description of the Prior Art

A car is slowed or stopped by utilizing a frictional force which is produced by pressing a brake lining onto the surface of a brake plate attached to an axle. During braking, the temperature of the surface layer of the brake plate rotating at a high speed together with the adjacent portions of the axle is raised very rapidly by the frictional force between the surface layer of the brake plate and the brake lining.

Heretofore, in production of such brake plates, grey cast iron has been widely used in view of its stable coefficient of friction and excellent wear resistance. However, due to the high speed of modern cars, the conditions under which the brake plate is used have become increasingly severe. This results in the occurrence of heat cracks in the sliding friction surface of the brake plate. In many cases, the growth of such heat cracks leads to the breakdown of the brake plate.

That is, when a car is operated at high speed, the temperature of the surface layer of the brake plate due to the braking action sometimes reaches a temperature range within which softening and plastic deformation of the material constituting the surface layer occurs and, therefore, the surface layer of the brake plate is subjected to heat expansion and compression deformation due to the large compression stress applied.

When the braking action is removed after such a rapid increase in the temperature of the surface layer of the brake plate, the heat generated in the surface layer of the brake plate is dissipated resulting in the cooling of the surface layer. However, as the cooling proceeds, tensile stress is produced in the surface layer which has been compression-deformed at the high temperature under the influences of the normal inner portion of the brake plate. This tensile stress tends to cause areas of fine fracturing. On repeating the braking action, the surface layer of the brake plate is repeatedly subjected to the above-described heat cycle so that the areas of fine fractures grow to form heat cracks. Even though the tensile stress may not break the material, it remains as residual stress. After subsequent repeated heat cycles, the stress gradually accumulates finally breaking the brake plate.

When materials having high crack transmission properties are subjected to the above described heat and stress action, cracks formed therein tend to grow rapidly. Although the grey cast iron conventionally used in the production of brake plates has a stable coefficient of friction and excellent wear resistance, that is, so-called excellent brake characteristics, its tendency for crack formation and growth is greater than that of general machine construction materials. Furthermore, a tensile strength of the conventional brake plate grey cast is low.

In order to improve grey cast iron for use as a brake material, alloy elements such as Ni, Cr, and Mo have been added to the material. With such alloy element-containing grey cast iron, however, heat cracking still occurs and the growth of such cracks cannot be prevented.

SUMMARY OF THE INVENTION

The invention provides a high performance composite metal material having excellent durability for use in production of a brake plate of a friction brake. This composite metal material is composed of grey cast iron which is used as the surface layer of the brake plate so that its excellent braking properties can be used to advantage and a different metal having a high strength which is capable of preventing the growth of cracks caused by heat impact or heat fatigue resulting from the heat generated at the sliding friction surface.

In accordance with the invention, by the provision of a brake plate made from a composite material composed of grey cast iron used as the surface layer of the brake plate and another metal of high strength and having a high crack transmission resistance metallurgically bonded to the grey cast iron, the growth of heat cracks formed in the grey cast iron layer is prevented and thus breakdown of the brake plate is prevented.

BRIEF DESCRIPTION OF THE DRAWINGS

FIG. 1 is a partial cross-sectional view of a composite metal material for a friction brake in accordance with the invention;

FIG. 2 is a partial cross-sectional view of a three-layer composite metal material in which a different metal having a high strength is used as an intermediate layer; and FIG. 3 is a graph showing the relation between the number of repeats and crack length when a tensile load is repeatedly applied to a composite metal material composed of grey cast iron and carbon steel in accordance with this invention.

DESCRIPTION OF THE PREFERRED EMBODIMENTS

The invention will be hereinafter described in detail with reference to the accompanying drawings.

In FIG. 1, reference numeral 1 indicates a surface metal layer of grey cast metal, 2 indicates a layer of high strength different metal, 3 indicates the outer surface of the surface metal 1, 4 indicates a metallurgical boundary between the layers 1 and 2, and 5 indicates a heat crack.

The metal surface 1, which is a sliding friction surface of a brake plate and which is subjected to abrupt frictional heating, i.e., thermal shock, is made of grey cast iron which has a low crack transmission resistance and low strength although it has excellent braking characteristics. The high strength metal 2 may, for example, be carbon steel, low alloy steel, stainless steel, copper, copper alloy, high strength cast iron or the like. The grey cast iron and high strength metal are metallurgically bonded together by casting, high temperature compression or the like to form a composite metal material.

With the composite metal material having the abovedescribed construction, a crack 5 appearing in the surface 3 of the layer 1 which is subjected to heat impact can grow for a short distance towards the interior of the brake plate. However, when the crack 5 reaches the metallurgically bonded boundary 4 between the grey cast iron and the high strength metal, it is prevented from going any further by the high strength metal. As a result, even if a number of cracks 5 are formed in the surface metal 1, the brake plate will not break down and yet the excellent braking characteristics of the surface metal 1 are maintained. Furthermore, the durability of the brake plate is greatly increased.

In another embodiment of the invention, as illustrated in FIG. 2, the composite metal material is composed of a surface metal layer 1 of grey cast iron, an intermediate layer of a high strength different metal 2' such as carbon steel, low alloy steel, stainless steel, copper, copper alloy, high strength cast iron, or the like, and a third layer 6 of a strong metal material from among grey cast iron, carbon steel, low alloy steel, stainless steel, high strength cast iron or the like but which is a different material from that of the intermediate layer. That is, the high strength different metal 2' is sandwiched between the other two metals and metallurgically bonded thereto. With a brake plate produced from the above described composition metal material, the same effects as described above are obtained.

It goes without saying that the composite metal material of the invention can be used in the production of a brake drum for a drum brake.

The following examples are given to illustrate the invention in greater detail.

EXAMPLE 1

A composite metal material (total thickness 25 mm, width 40 mm, and length 150 mm) composed of a 5 mm thick grey cast iron surface metal layer and a 20 mm thick 0.3% carbon steel layer metallurgically bonded to the surface metal layer was prepared and was subjected to heat impact testing.

The grey cast iron surface metal was brought into contact with a molten lead bath maintained at 700° C. for a period of 30 seconds and then immediately cooled by blowing air thereon. When the above procedure was repeated above five times, the formation of thermal cracks was observed in the surface of the grey cast iron using a dye permeation technique. When the thermal shock was repeated additionally about 25 times, it was confirmed that several cracks went through the grey cast iron portion and reached the boundary between the grey cast iron layer and the 0.3% carbon steel layer. Thereafter, the thermal shock was repeated. However, even though the thermal shock was repeated about 150 times, the cracks did not go beyond the bonding surface between the grey cast iron layer and the carbon steel layer.

A series of test pieces were prepared in the same manner as above except that low alloy steel, stainless steel, copper, copper alloy and high strength cast iron were each used in place of the 0.3% carbon steel as the high strength different metal metallurgically bonded to the grey cast iron. With all of these test pieces, almost the same results as above were obtained.

Furthermore, a composite metal test piece (total thickness 25 mm, width 3 mm, and length 150 mm) was prepared by metallurgically bonding a 5 mm thick grey cast iron layer and a 20 mm thick 0.3% carbon steel layer. The test piece was provided with a notch having a depth of 2 mm in the middle thereof. To this test piece was applied repeatedly a tensile load in the lengthwise direction thereof and the state in which a crack starting from the notck went through the grey cast iron layer and was stopped or prevented from growing by the carbon steel layer having a high crack transmission resistance was observed. The results are shown in FIG. 3.

When an excessive repeated tensile load of 700 Kg was applied, the crack grew and reached the boundary between the grey cast iron layer and the carbon steel layer. Although it remained there for a certain number of repeated applications of the tensile load, the crack went beyond the boundary. On the other hand, when a suitable repeated tensile load of 500 Kg was applied, the crack did not grow into the interior of the carbon steel even though the application of the tensile load was repeated after the crack reached the boundary.

For comparison, a test piece composed of grey cast iron alone and having the same dimensions as above was subjected to heat impact testing in the same manner as described above. When the procedure was repeated about 50 times, several cracks grew and reached about ½ of the total thickness. The comparison test piece was easily broken by hitting it lightly with a hammer.

EXAMPLE 2

A three-layer composite metal material (total thickness 25 mm, width 40 mm, and length 150 mm) as illustrated in FIG. 2 was prepared by metallurgically bonding a 5 mm thick SUS 304 austenite stainless steel layer on a 5 mm thick grey cast iron layer as a surface metal and furthermore by metallurgically bonding a 15 mm thick grey cast iron layer to the stainless steel layer. To the surface of the three-layer composite metal material thus formed was applied heat impact in the same manner as in Example 1.

When the application of the heat impact was repeated about five times, the formation of cracks in the surface of the grey cast iron was observed by the dye permeation technique. When the application of the heat impact was further repeated about 30 times, the cracks starting from the surface reached the boundary between the grey cast iron layer and the stainless steel layer. However, even though the application of the heat impact was repeated about 150 times thereafter, the cracks did not go beyond the bonding surface. It was thus confirmed that the cracks could not reach at all the grey cast iron layer at the opposite side of the stainless steel layer.

As apparent from the above results, the composite metal material of the invention for use in production of a friction brake is greatly improved in resistance to heat impact while retaining excellent braking characteristics, specifically, a stable friction coefficient and high abrasion resistance which grey cast iron inherently possesses. Moreover, the material of the invention is well-suited for a brake plate or a brake drum having excellent durability.

What is claimed is:

1. A friction brake which comprises: a brake plate or brake drum, said plate or drum having a sliding friction surface metal layer comprising grey cast iron; an intermediate metal layer co-extensive with at least a portion of said surface layer and comprising a high strength different metal having high tensile stress resistance and a high crack transmission resistance; and a third layer co-extensive with at least a portion of said intermediate metal layer and comprising a metal material, said grey cast iron layer being metallurgically bonded to said high strength different metal layer at their interface, and said high strength different metal layer being metallurgically bonded to said metal material layer at their interface, wherein said intermediate high strength different metal layer prevents cracks formed in said surface metal layer from spreading.

2. The friction brake of claim 1 wherein said intermediate metal comprises a metal selected from the group consisting of carbon steel, low alloy steel, stainless steel, copper, copper alloy, and high strength cast iron.

3. The friction brake of claim 1 or 2 wherein said metal material of said third layer comprises a metal selected from the group consisting of grey cast iron, carbon steel, low alloy steel, stainless steel, and high strength cast iron, and wherein said metal material of said third layer is a different metal than said intermediate metal.

* * * * *